(12) United States Patent
Tedeschi

(10) Patent No.: US 9,839,826 B2
(45) Date of Patent: Dec. 12, 2017

(54) COLLAPSIBLE TARGET FOR IMPROVING AN ATHLETE'S THROWING ACCURACY

(71) Applicant: Michael Alfonso Tedeschi, Sharpsburg, MD (US)

(72) Inventor: Michael Alfonso Tedeschi, Sharpsburg, MD (US)

( * ) Notice: Subject to any disclaimer, the term of this patent is extended or adjusted under 35 U.S.C. 154(b) by 0 days.

(21) Appl. No.: 15/422,203

(22) Filed: Feb. 1, 2017

(65) Prior Publication Data
US 2017/0216694 A1 Aug. 3, 2017

Related U.S. Application Data

(60) Provisional application No. 62/290,284, filed on Feb. 2, 2016.

(51) Int. Cl.
| | | |
|---|---|---|
| *A63B 63/00* | (2006.01) | |
| *A63B 69/00* | (2006.01) | |
| *G09B 19/00* | (2006.01) | |
| A63B 102/14 | (2015.01) | |
| A63B 67/06 | (2006.01) | |

(52) U.S. Cl.
CPC .......... *A63B 69/00* (2013.01); *G09B 19/0038* (2013.01); *A63B 63/00* (2013.01); *A63B 67/06* (2013.01); *A63B 2102/14* (2015.10); *A63B 2210/50* (2013.01); *A63B 2225/093* (2013.01)

(58) Field of Classification Search
CPC ............. A63B 63/00; A63B 2063/002; A63B 2210/50; A63B 2225/09; A63B 67/06
USPC ......... 273/398–402, 197, 476–478, 483, 484
See application file for complete search history.

(56) References Cited

U.S. PATENT DOCUMENTS

| | | | | | |
|---|---|---|---|---|---|
| 574,087 | A | * | 12/1896 | Frick ...................... | A63B 67/06 273/402 |
| 4,936,578 | A | * | 6/1990 | Hudson, Sr. ........... | A63B 63/00 273/402 |
| 6,834,858 | B1 | * | 12/2004 | Reineke ................. | A63B 63/00 273/400 |
| 7,252,604 | B2 | * | 8/2007 | Birss .................... | A63B 63/003 273/392 |
| 8,900,076 | B1 | * | 12/2014 | Shropshire ........... | A63B 69/002 273/400 |
| 2010/0140873 | A1 | * | 6/2010 | Britton .................. | A63B 63/00 273/398 |

(Continued)

*Primary Examiner* — Mark Graham

(57) ABSTRACT

To improve throwing accuracy an athlete can makes use of a collapsible target training device that can be easily stored, transported, and deployed. The collapsible target training device includes multiple collapsible frames, multiple ball catching nets, a base, and a frame adjustment mechanism. The multiple collapsible frames are articulated frames that are connected in a series to form a scissors mechanism. This enables the series of collapsible frames to be extended into a tower or collapsed toward the base. The base is a rigid platform that prevents the series of collapsible frames from toppling over while extended. The series of collapsible frames is mounted onto the base so that the base is able to provide structural support and stability to the series of collapsible frames when extended to form a tower. The multiple ball-catching nets are attached to the series of collapsible frame. This positioning enables the multiple ball-catching nets to catch the balls thrown through the series of collapsible frame.

19 Claims, 10 Drawing Sheets

(56) References Cited

U.S. PATENT DOCUMENTS

2015/0328515 A1* 11/2015 Prendergast ........... A63B 67/06
  273/400
2016/0136498 A1* 5/2016 Jones ..................... A63B 69/38
  473/435

* cited by examiner

COLLAPSIBLE TARGET FOR IMPROVING AN ATHLETE'S THROWING ACCURACY

The current application claims a priority to the U.S. Provisional Patent application Ser. No. 62/290,284 filed on Feb. 2, 2016.

FIELD OF THE INVENTION

The present invention relates generally to a sport training device. More specifically, the present invention is a collapsible frame that is used to improve the throwing accuracy of an athlete.

BACKGROUND OF THE INVENTION

Lacrosse is the fastest growing sport in the U.S.A. and involvement grows larger by the day. The present invention is a tool that can be deployed in seconds and is portable. Additionally, the present invention can be carried and deployed anywhere generates tremendous advantages to those in the lacrosse game.

The present invention is a personable, portable, expandable, collapsible, practice targeting training device. The present invention was conceived as a tool to hone the throwing skills of a lacrosse player. The present invention consists of a unique shape and size that is designed to be compact, portable, easy to set-up and easy to carry.

Traditional lacrosse practice units are large and require more time to set-up. Most existing devices have too many pieces to them. The present invention, the collapsible target for improving an athlete's throwing accuracy, is small enough to set-up and collapse in a small area and is able to do so repeatedly in minutes. The three diamonds-three color shape of the net targets allows for varied practice and for one or more players. Practice can be set-up plays designed by the user or coach that hone target skills and timing skills by having the player throw at the different targets as called out on the fly. Conditions and playing terrain can also be changed suddenly by collapsing the present invention, moving it somewhere else, and then setting it back up in seconds. The unique design of the present invention also allows for the owner to collapse and pack the unit away quickly in a trunk or back seat of a car after practice has finished.

DETAIL DESCRIPTIONS OF THE INVENTION

All illustrations of the drawings are for the purpose of describing selected versions of the present invention and are not intended to limit the scope of the present invention.

The preferred embodiment of the present invention, the collapsible target for improving an athlete's throwing accuracy, is a collapsible piece of athletic equipment that is used to train the throwing accuracy of a user. The present invention has targets which are positioned at various heights along the frame. The positioning of the targets is used to indicate to the user the optimal location that a ball should be thrown during an actual game. Additionally, each target is equipped with a pouch that is used to catch a ball that is thrown by the user. In its preferred embodiment, the present invention is designed to be an adjustable target for lacrosse players. To that end, the present invention is able to be placed into an extended configuration or a collapsed configuration. While in the extended configuration, the collapsible multitiered frame holds the targets at positions which facilitate catching a ball thrown during target practice. Conversely, while the present invention is in the collapsed configuration, the targets of the collapsible multitiered frame cannot be used to catch a thrown ball. Additionally, the entire collapsible multitiered frame is moved into a generally flattened arrangement which facilitates transporting and storing the present invention.

Figure 1:
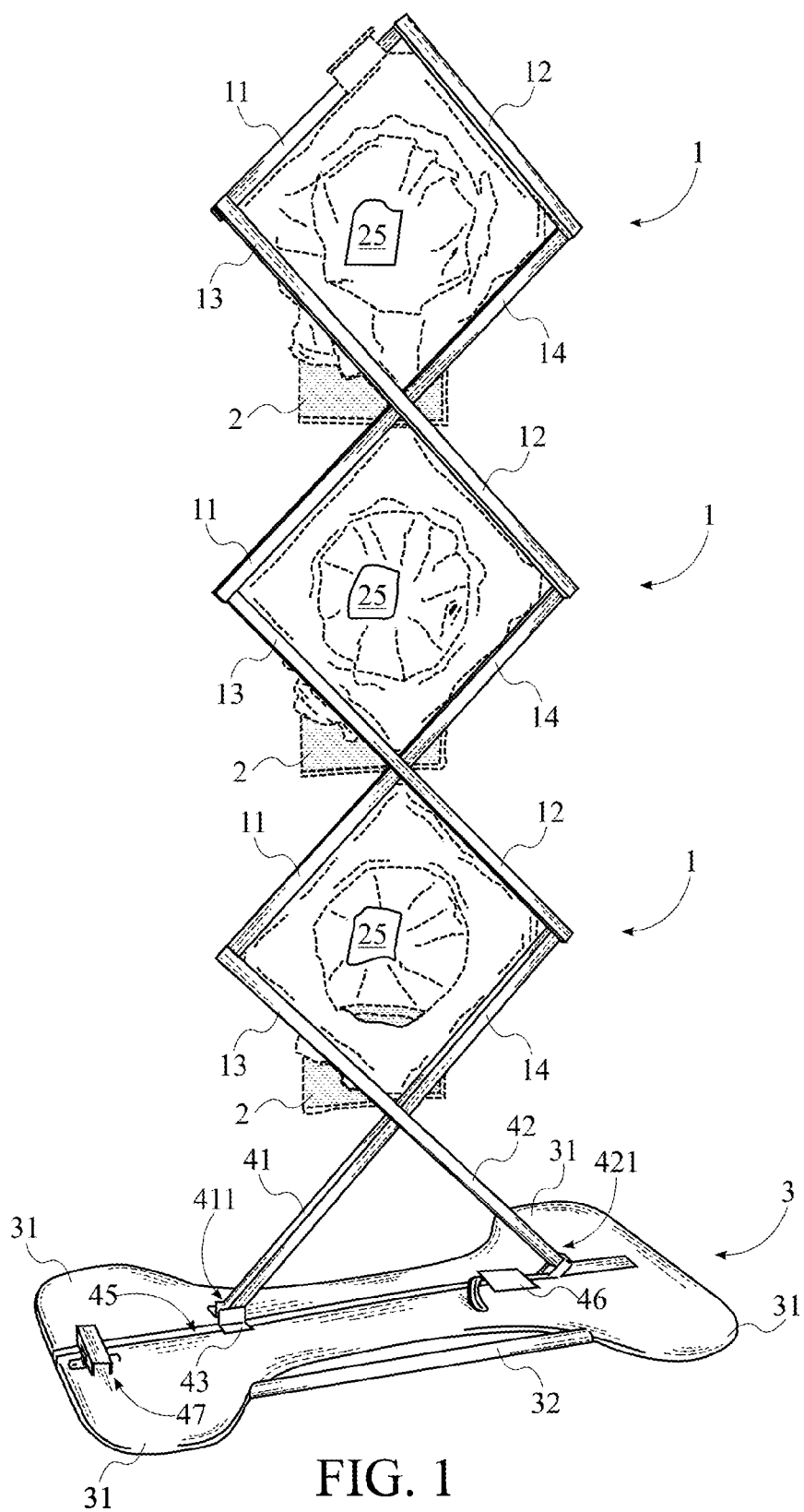
FIG. 1 is a perspective view of the present invention in the extended configuration.
Figure 7:
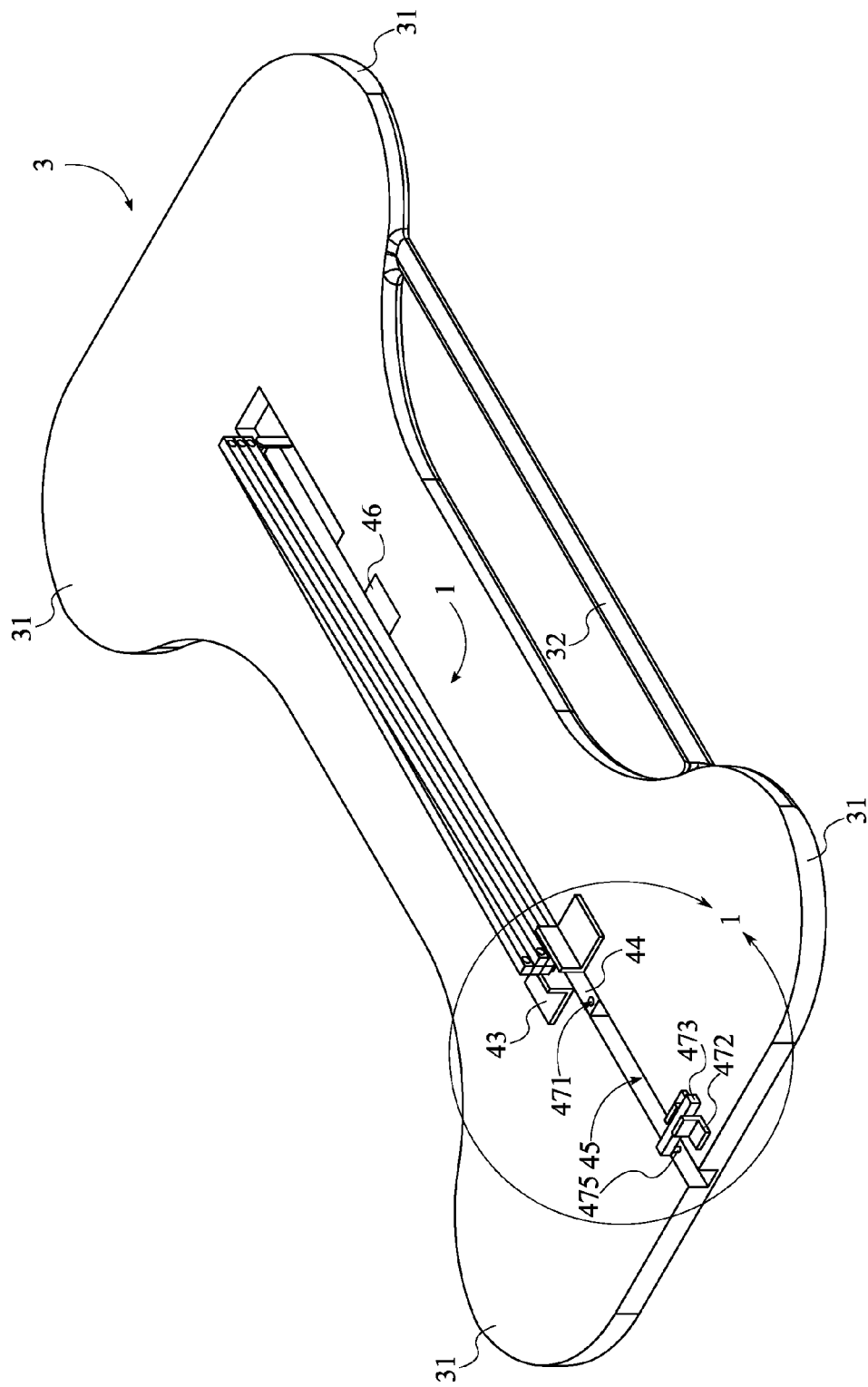
FIG. 7 is a perspective view of the present invention in the extended configuration without the plurality of ball-catching nets.

In reference to FIG. 1 and FIG. 7, the present invention is a collapsible target for improving an athlete's throwing accuracy and comprises a plurality of collapsible frames 1, a plurality of ball-catching nets 2, a base 3 and a frame adjustment mechanism 4. The plurality of collapsible frames 1 forms the articulated structure that holds the targets of the present invention in a desired position while the present invention is in an extended configuration. Conversely, the plurality of collapsible frames 1 can be moves into the collapsed configured to transport or store the present invention. The plurality of ball-catching nets 2 is a collection of nets that are attached to the plurality of collapsible frames 1. Each of the plurality of ball-catching nets 2 is a netted pouch that is capable of holding a ball that is thrown at the present invention. The base 3 is a rigid structure that supports the plurality of collapsible frames 1. Additionally, the base 3 is structured in such a way that prevents the present invention from toppling over while in the extended configuration. For example, the base 3 can be weighted or affixed to the ground. The frame adjustment mechanism 4 is a component that moves the plurality of collapsible frames 1 between the extended configuration and the collapsed configuration. The frame adjustment mechanism 4 is also used to lock the plurality of collapsible frames 1 in the extended configuration.

Figure 5:
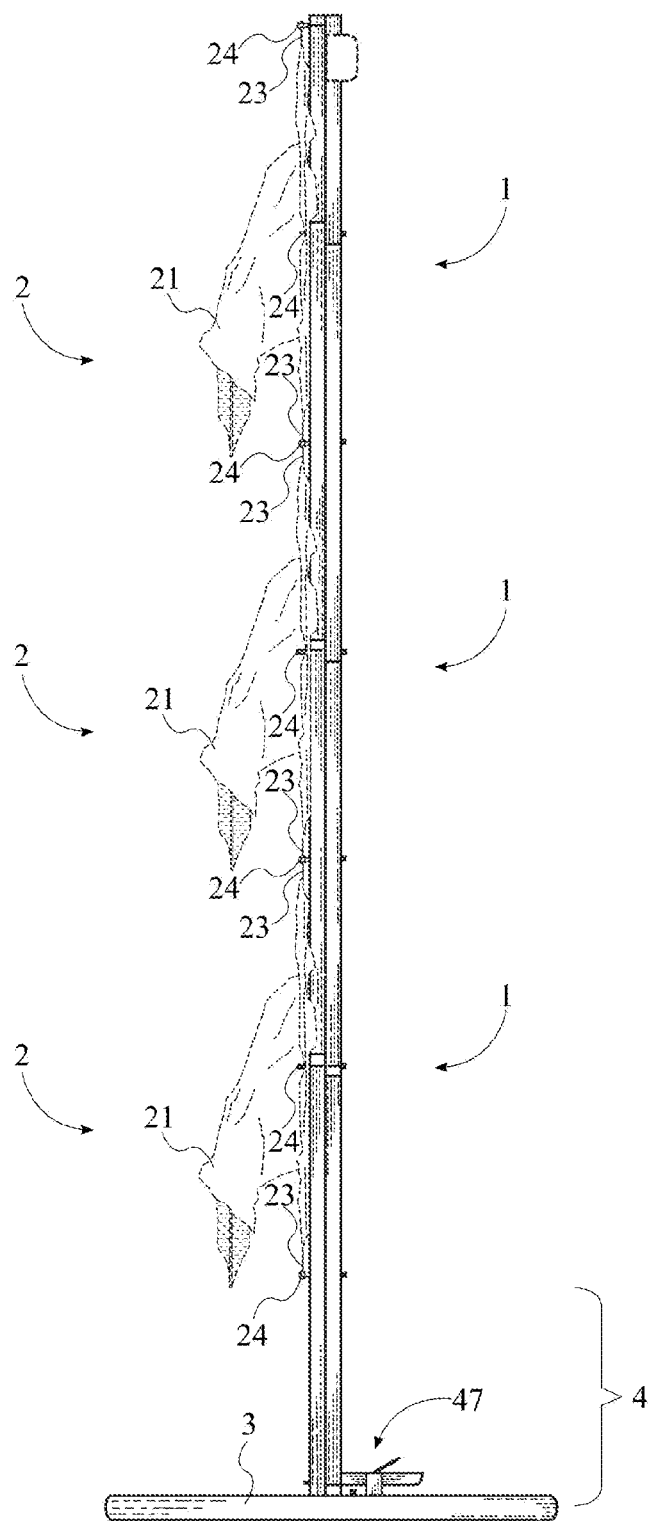
FIG. 5 is a left-side view of the present invention in the extended configuration.

In reference to FIG. 5, the plurality of collapsible frames 1 is serially connected to each other so that the plurality of collapsible frames 1 forms a tower while the present invention is in the extended configuration. This enables the plurality of collapsible frames 1 to shape a plurality of targets which are positioned at various heights. Additionally, the plurality of collapsible frames 1 is mounted onto the base 3 by the frame adjustment mechanism 4. Consequently, the frame adjustment mechanism 4 is used to maintain the plurality of collapsible frames 1 in a desired orientation and configuration, relative to the base 3. Finally, each of the plurality of ball-catching nets 2 is connected within a corresponding collapsible frame from the plurality of collapsible frames 1. As a result, each of the ball-catching nets 2 is able to catch a ball that is thrown through the corresponding collapsible frame. This configuration enables the plurality of collapsible frames 1 to function as a plurality of targets that catch the balls thrown by the user. Conversely, the present invention can be easily collapsed for storage or transport.

Figure 2:
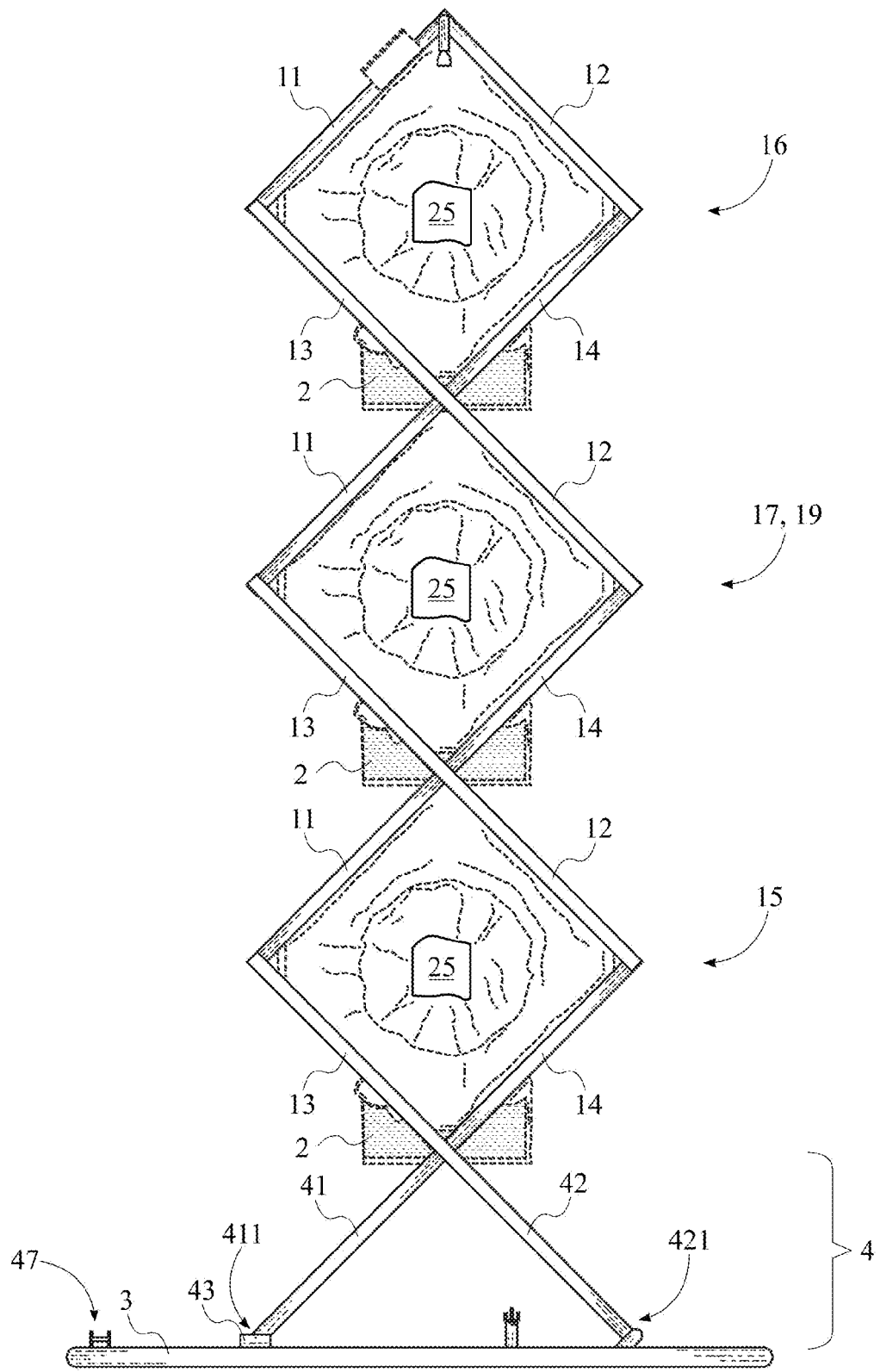
FIG. 2 is a front view of the present invention in the extended configuration.

In reference to FIG. 1 and FIG. 2, each of the plurality of collapsible frames 1 comprises a top-left member 11, a top-right member 12, a bottom-left member 13, and a bottom-right member 14. The top-left member 11, the top-right member 12, the bottom-left member 13, and the bottom-right member 14 are rigid beams that are arranged to form an articulated diamond-shaped collapsible frame. Additionally, the top-left member 11, the top-right member 12, the bottom-left member 13, and the bottom-right member 14 are preferably hollow aluminum rods. However, each of the plurality of collapsible frames 1 can alternatively be made of, but is not limited to, metal, plastic, or wood. The top-left member 11 is hingedly and adjacently connected to the top-tight member. Thus, enabling the top-left member 11 and the top-right member 12 to form the pivoting upper corner of the diamond-shaped collapsible frame. Similarly, the bottom-left member 13 is hingedly and adjacently connected to the top-left member 11, opposite to the top-right member 12. Accordingly, the top-left member 11 and the bottom-left member 13 form the pivoting left corner of the diamond-shaped collapsible frame. Furthermore, the bottom-right member 14 is hingedly and adjacently connected to the bottom-left member 13, opposite to the top-left member 11, so that the bottom-left member 13 and the bottom-right member 14 form the pivoting bottom corner of the diamond-shaped collapsible frame. Finally, the top-right member 12 is hingedly and adjacently connected to the bottom-right member 14, opposite to the bottom-left member 13. Consequently, the top-right member 12 and the bottom-right member 14 form the pivoting right corner of the diamond-shaped collapsible frame.

Figure 3:
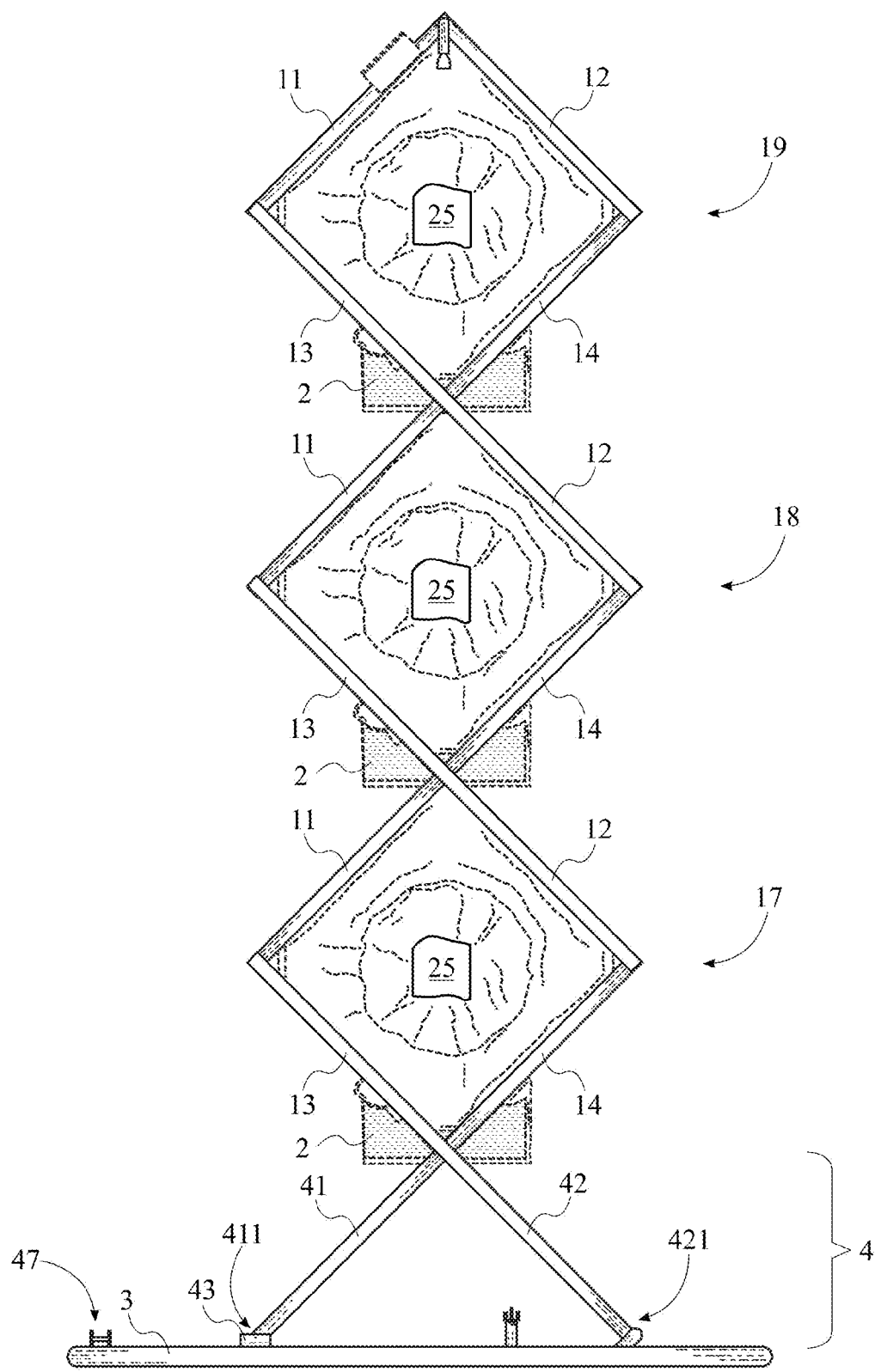
FIG. 3 is a front view of the present invention in the extended configuration. This view indicates the position of the preceding frame, the intermediary frame, and the subsequent frame.

In reference to FIG. 1 FIG. 2, and FIG. 3, the plurality of collapsible frames 1 further comprises a lowest frame 15 and a subsequent frame 19 because the plurality of collapsible frames 1 is arranged into a series. The lowest frame 15 is the collapsible frame that is connected to the frame adjustment mechanism 4. The subsequent frame 19 is the collapsible frame that immediately follows the lowest frame 15 The frame adjustment mechanism 4 comprises a first scissor-lift member 41 and a second scissor-lift member 42. The first scissor-lift member 41 and the second scissor-lift member 42 are rigid beams that are used to support and actuate the plurality of collapsible frames 1. To that end, the first scissor-lift member 41 is collinearly and adjacently connected to the bottom-right member 14 of the lowest frame 15. As a result, the motion of the first scissor-lift member 41 is transferred to the bottom-right member 14 of the lowest frame 15. Similarly, the second scissor-lift member 42 is collinearly and adjacently connected to the bottom-left member 13 of the lowest frame 15. Thus connected, the second scissor-lift member 42 is able to actuate the bottom-left member 13 of the lowest frame 15. Moreover, the bottom-right member 14 of the subsequent frame 19 is collinearly and adjacently connected to the top-left member 11 of the lowest frame 15. Accordingly, the motion of the top-left member 11 of the lowest frame 15 is transferred to the bottom-right member 14 of the subsequent frame 19. Finally, the bottom-left member 13 of the subsequent frame 19 is collinearly and adjacently connected to the top-right member 12 of the lowest frame 15 so that the motion of the top-right member 12 of the lowest frame 15 can be directly transferred to the bottom-left member 13 of the subsequent frame 19. In the preferred embodiment of the present invention, the first scissor-lift member 41 and the second scissor-lift member 42 form an X-shaped truss commonly known as a scissors mechanism. Therefore, moving the first scissor-lift member 41 and the second scissor-lift member 42 in a scissors motion causes the plurality of collapsible frames 1 to move in a scissors motion. Furthermore, the plurality of collapsible frames 1 is moved between the collapsed configuration and the extended configuration by moving the first scissor-lift member 41 and the second scissor-lift member 42 through the scissors motion.

Figure 4:
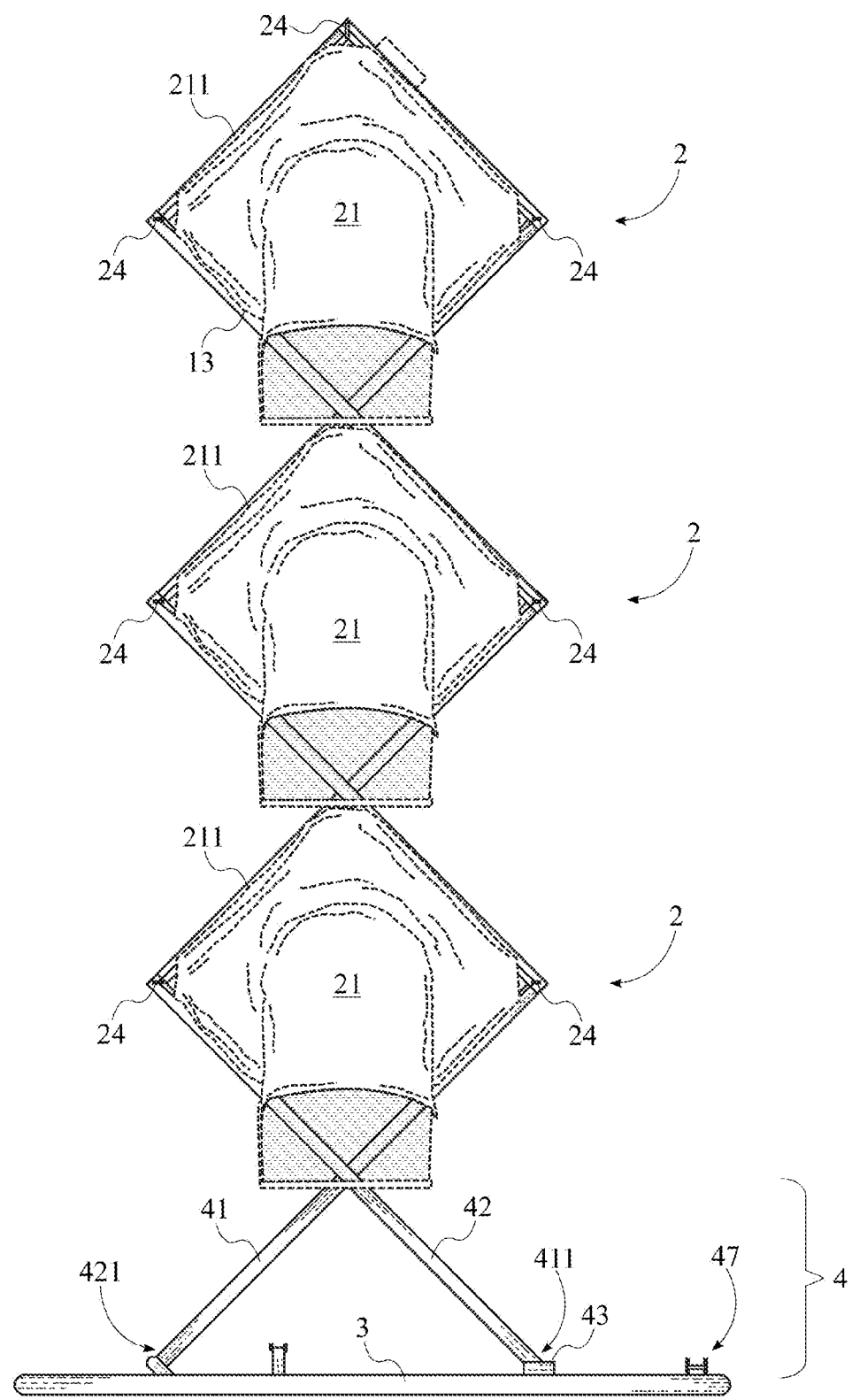
FIG. 4 is a rear view of the present invention in the extended configuration.

In reference to FIG. 1, FIG. 2, and FIG. 4, the plurality of collapsible frames 1 further comprises a highest frame 16 and a preceding frame 17 because the plurality of collapsible frames 1 is arranged into a series. The highest frame 16 is the furthest collapsible frame from the base 3, and the preceding frame 17 is the penultimate collapsible frame from the base 3. To that end, the bottom-right member 14 of the highest frame 16 is collinearly and adjacently connected to the top-left member 11 of the preceding frame 17. Consequently, the motion of the top-left member 11 of the preceding frame 17 is transferred to the bottom-right member 14 of the highest frame 16. Furthermore, the bottom-left member 13 of the highest frame 16 is collinearly and adjacently connected to the top-right member 12 of the preceding frame 17. As a result, the motion of the top-right member 12 of the preceding frame 17 can be directly transferred to the bottom-left member 13 of the highest frame 16.

In reference to FIG. 1, through FIG. 4 the plurality of collapsible frames 1 further comprises an intermediary frame 18, a preceding frame 17, and a subsequent frame 19. The intermediary frame 18 is any collapsible frame that is positioned between two collapsible frames within the plurality of collapsible frames 1. The preceding frame 17 is the collapsible frame that is connected to the side of the intermediary frame 18 that is oriented toward the toward the frame adjustment mechanism 4. Conversely, the subsequent frame 19 is the collapsible frame that is connected to the side of the intermediary frame 18 that is opposite the preceding frame 17. To that end, the bottom-right member 14 of the intermediary frame 18 is collinearly and adjacently connected to the top-left member 11 of the preceding frame 17. Thus connected, the motion of the top-left member 11 of the preceding frame 17 is transferred to the bottom-right member 14 of the intermediary frame 18. Additionally, the bottom-left member 13 of the intermediary frame 18 is collinearly and adjacently connected to the top-right member 12 of the preceding frame 17. Accordingly, the motion of the top-right member 12 of the preceding frame 17 can be directly transferred to the bottom-left member 13 of the intermediary frame 18. Furthermore, the bottom-right member 14 of the subsequent frame 19 is collinearly and adjacently connected to the top-left member 11 of the intermediary frame 18 so that the motion of the top-left member 11 of the intermediary frame 18 is transferred to the bottom-right member 14 of the subsequent frame 19. Finally, the bottom-left member 13 of the subsequent frame 19 is collinearly and adjacently connected to the top-right member 12 of the intermediary frame 18. Consequently, the motion of the top-right member 12 of the intermediary frame 18 can be directly transferred to the bottom-left member 13 of the subsequent frame 19.

Figure 8:
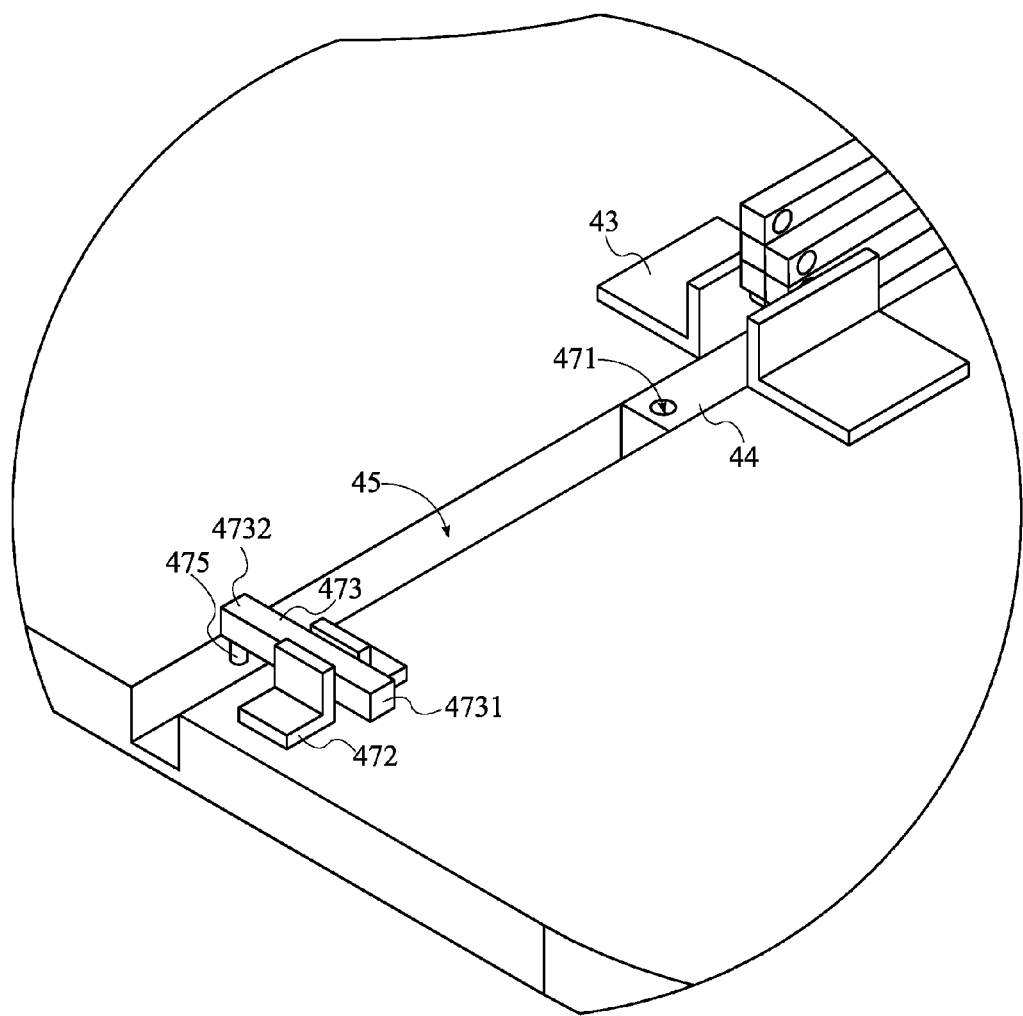
FIG. 8 is a detailed view of line 1 shown in FIG. 7.

In reference to FIG. 1, FIG. 7, and FIG. 8, the frame adjustment mechanism 4 is used to move the plurality of collapsible frames between the collapsed configuration and the extended configuration. To that end, the frame adjustment mechanism 4 further comprises a fixed frame mount 43, a slide bar 44, a recessed track 45, a bar brace 46, and a locking mechanism 47. The fixed frame mount 43 is a connection mechanism that is used to attach the first scissor-lift member 41 to the base 3. The slide bar 44 is a rigid beam used to reposition the first scissor-lift member 41 along the recessed track 45. The recessed track 45 is a channel that is cut into the base 3 and functions as the pathway along which the slide bar 44 moves. The bar brace 46 is a rigid plate that retains the slide bar 44 within the recessed track 45. The locking mechanism 47 is a locking device that is used to restrict the motion of the slide bar 44 while engaged.

The components of the frame adjustment mechanism 4 work in concert to anchor the plurality of collapsible frames 1 to the base without impeding the collapsing functionality. To that end, the recessed track 45 traverses into the base 3. As a result, the slide bar 44 is able to move through the recessed track 45 along the base 3. The fixed frame mount 43 is adjacently connected to the base 3. Thus, the fixed frame mount 43 functions as an anchor point for the first scissor-lift member 41. Additionally, the fixed frame mount 43 is positioned across the recessed track 45. Accordingly, the fixed frame mount 43 is used to align the motion of the first scissor-lift member 41 with the slide bar 44. A distal end 411 of the first scissor-lift member 41 is pivotably connected to fixed frame mount 43 so that the first scissor-lift member 41 is able to pivot about the fixed frame mount 43 as the first scissor-lift member 41 and the second scissor-lift member 42 move in a scissors motion. The slide bar 44 is slidably engaged along the recessed track 45. Consequently, the slide bar 44 is able to slide along the recessed track 45 as the first scissor-lift member 41 and the second scissor-lift member 42 move in a scissors motion. A distal end 421 of the second scissor-lift member 42 is pivotably connected to the slide bar 44. As a result, moving the slide bar 44 along the recessed track 45 causes the second scissor-lift member 42 to actuate the plurality of collapsible frames 1; moving the plurality of collapsible frames 1 between the collapsed configuration and the extended configuration in a scissors motion that is similar to a scissor lift. The distal end 411 of the first scissor-lift member 41 and the distal end 421 of the second scissor-lift member 42 are positioned offset from each other along the recessed track 45. Thus, the distal end 411 of the first scissor-lift member 41 and the distal end 421 of the second scissor-lift member 42 are positioned to facilitate moving the plurality of collapsible frames 1 between the extended configuration and the collapsed configuration.

Furthermore, the bar brace 46 is adjacently connected to the base 3 in between the distal end 411 of the first scissor-lift member 41 and the distal end 421 of the second scissor-lift member 42. Accordingly, the bar brace 46 is used to retain the slide bar 44 within the recessed track 45. That is, the bar brace 46 works in concert with the fixed frame mount 43 to prevent the slide bar 44 from becoming dislodged from the recessed track 45. To that end, the bar brace 46 is positioned across the recessed track 45 so that the slide bar 44 is able to move horizontally along the recessed track 45 while being restricted from vertical displacement. The locking mechanism 47 is operatively integrated between the slide bar 44 and the recessed track 45, wherein the locking mechanism 47 is actuated to hold the slide bar 44 in place along the recessed track 45. Consequently, the engaged locking mechanism 47 retains the slide bar 44 in a position that impels the first scissor-lift member 41 and the second scissor-lift member 42 to move the plurality of collapsible frames 1 into the extended configuration. Conversely, the disengaged locking mechanism 47 enables the slide bar 44 to move into a position that impels the first scissor-lift member 41 and the second scissor-lift member 42 to move the plurality of collapsible frames 1 into the collapsed configuration.

Figure 9:
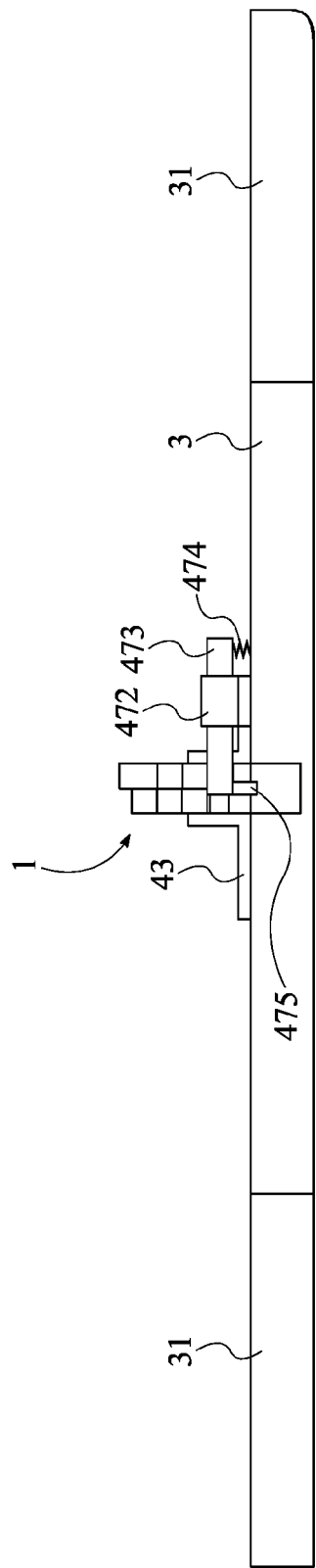
FIG. 9 is a left-side view of the present invention in the extended configuration without the plurality of ball-catching nets.

In reference to FIG. 1, FIG. 7, and FIG. 9, the locking mechanism 47 comprises a lock hole 471, an arm support 472, a rocker arm 473, a spring 474, and a lock pin 475. The locking mechanism 47 is a user-actuated and spring-loaded lever that engages with the slide bar 44 to hold the plurality of collapsible frames 1 in the extended configuration. The arm support 472 is a rigid mount that acts as a fulcrum for the rocker arm 473. The rocker arm 473 is a lever that is the user actuates to engage or disengage the locking mechanism 47. The spring 474 is designed to force the rocker arm 473 into the engaged position. The lock pin 475 is a rigid protrusion that is used to engage into the lock hole 471. The lock hole 471 laterally traverses into the slide bar 44 so that the lock hole 471 can function as a receptacle for the lock pin 475. The rocker arm 473 is pivotably mounted to the base 3 by the arm support 472. As a result, the rocker arm 473 is maintained in a position which enables the user to pivot the rocker arm 473 about the arm support 472; thereby, enabling the user to selectively engage or disengage the locking mechanism 47. The spring 474 is connected between a first end 4731 of the rocker arm 473 and the base 3. Thus positioned, the spring 474 provides the requisite force to pivot the rocker arm 473 into an engaged position whenever no externally applied force is present. The lock pin 475 is adjacently connected to a second end 4732 of the rocker arm 473. Accordingly, the lock pin 475 is terminally positioned on the rocker arm 473 enables the lock pin 475 to engage or disengage the lock hole 471 as the rocker arm 473 is actuated by the spring or the user. The lock hole 471 is engaged by the lock pin 475 so that the lock pin 475 is able to prevent the motion of the slide bar 44.

Figure 10:
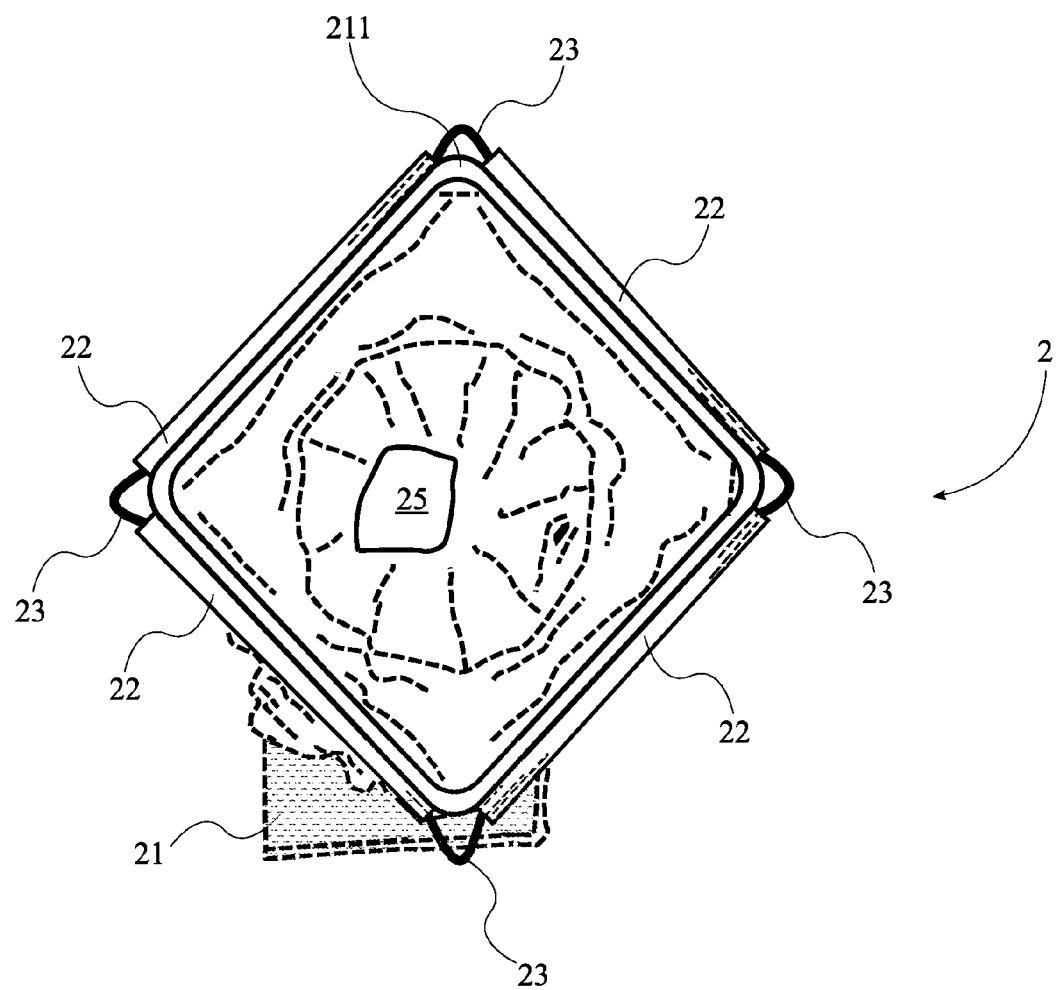
FIG. 10 is a front view of a single ball-catching net used in the present invention.

In reference to FIG. 1 and FIG. 10, each of the plurality of ball-catching nets 2 comprises a pouch 21, a rigid frame 22, an elastic band 23, and a plurality of net fasteners 24. The plurality of ball-catching nets 2 is designed to catch a ball that passes through the corresponding collapsible frame to which the ball catching net is attached. The pouch 21 is a flexible sack that is preferably made of a net. The rigid frame 22 is a support structure that mirrors the shape of the corresponding collapsible frame. Additionally, the rigid frame 22 is articulated or disjointed so that the plurality of ball-catching nets 2 is able to remain attached to a collapsible frame without impeding the ability of the plurality of collapsible frames 1 to move between the extended configuration and the collapsed configuration. The elastic band 23 is a loop of elastic material. The plurality of net fasteners 24 is a collection of fastening mechanisms used to connect the plurality of ball-catching nets 2 to the corresponding collapsible frame by fastening onto the elastic band 23. The plurality of net fasteners 24 can be, but is not limited to, eye bolts, clips, hooks, and latches. The pouch 21 comprises an opening rim 211 so that a ball thrown through the corresponding collapsible frame is able to enter the pouch 21. The rigid frame 22 is integrated around the opening rim 211. Consequently, the rigid frame 22 is used to hold the opening rim 211 of the pouch 21 in a shape that mimics the corresponding collapsible frame to which the pouch 21 is attached. The elastic band 23 is integrated around the opening rim 211. As a result, the elastic band 23 is able to attach the opening rim 211 of the pouch 21 onto the corresponding collapsible frame in a manner that enables the pouch 21 to absorb the momentum of a thrown ball. The plurality of net fasteners 24 is fixed around the corresponding collapsible frame. Thus affixed, the plurality of net fasteners 24 enables the elastic band 23 to become attached around the edge of the corresponding collapsible frame. The elastic band 23 is detachably attached to the plurality of net fasteners 24. Accordingly, the elastic band 23 can be disconnected from the plurality of net fasteners 24 so that the pouch 21 can be readily detached from the corresponding collapsible frame in case the momentum of the throw ball is too large for the present invention to absorb without toppling over. Each of the plurality of ball-catching nets 2 further comprises a target 25. The target 25 is a distinct visual indicator that is superimposed onto the pouch 21 so that the user is able to better aim a thrown ball.

Figure 6:
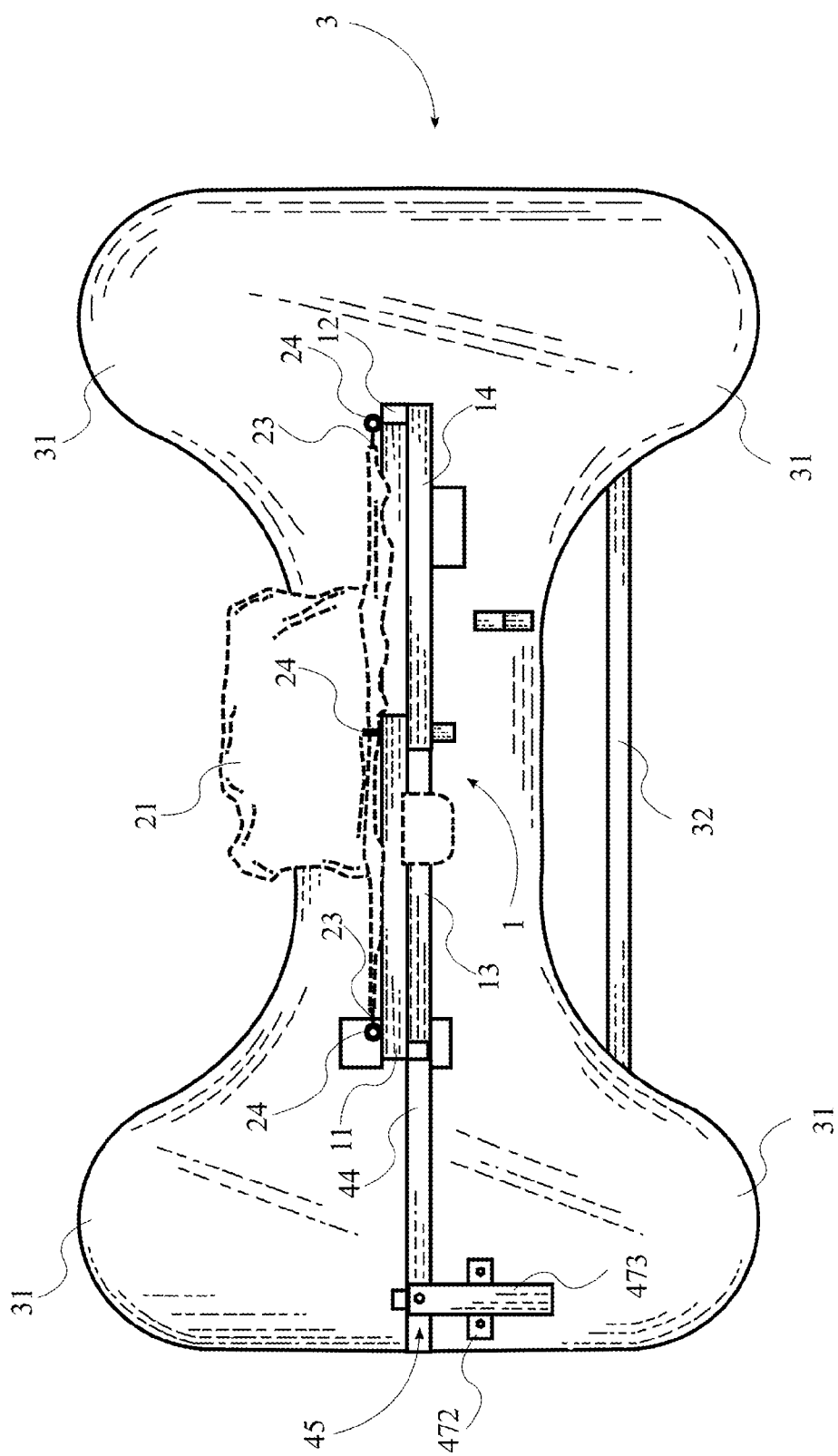
FIG. 6 is a top view of the present invention in the extended configuration.

In reference to FIG. 1 and FIG. 6, the present invention further comprises a plurality of stabilizing feet 31. The plurality of stabilizing feet 31 is a collection of protrusions that prevent the plurality of collapsible frames 1 from toppling over while in the extended configuration. To that end, the plurality of stabilizing feet 31 is distributed around the base 3. Consequently, the plurality of stabilizing feet 31 is able to buttress the base 3. Additionally, the plurality of stabilizing feet 31 is peripherally connected around the base 3. As a result, the plurality of stabilizing feet 31 is able to effectively distribute the force of impact from a thrown ball; further preventing the present invention from toppling over.

In reference to FIG. 1, the present invention further comprises a handle 32. The handle 32 enables the user to easily pick up and transport the present invention. The handle 32 is adjacently connected to the base 3. Thus connected, the handle 32 enables a user to pick up and manipulate the base 3. Additionally, the handle 32 is offset from the frame adjustment mechanism 4 along the base 3 so that the user's hand does not come into contact with the frame adjustment mechanism 4 while grasping the handle 32.

Although the invention has been explained in relation to its preferred embodiment, it is to be understood that many other possible modifications and variations can be made without departing from the spirit and scope of the invention as hereinafter claimed.

What is claimed is:

1. A collapsible target for improving an athlete's throwing accuracy comprises:
   a plurality of collapsible frames;
   a plurality of ball-catching nets;
   a base;
   a frame adjustment mechanism;
   the plurality of collapsible frames being serially connected to each other;
   the plurality of collapsible frames being mounted onto the base by the frame adjustment mechanism;
   each of the plurality of ball-catching nets being connected within a corresponding collapsible frame from the plurality of collapsible frames;
   each of the at least one ball-catching nets comprises a pouch, a rigid frame, an elastic band, and a plurality of net fasteners;
   the pouch comprises an opening rim;
   the rigid frame being integrated around the opening rim;
   the elastic band being integrated around the opening rim;
   the plurality of net fasteners being fixed around the corresponding collapsible frame; and
   the elastic band being detachably attached to the plurality of net fasteners.

2. The collapsible target for improving an athlete's throwing accuracy as claimed in claim 1 comprises:
   each of the plurality of collapsible frames comprises a top-left member, a top-right member, a bottom-left member, and a bottom-right member;
   the top-left member being hingedly and adjacently connected to the top-right member;
   the bottom-left member being hingedly and adjacently connected to the top-left member, opposite to the top-right member;
   the bottom-right member being hingedly and adjacently connected to the bottom-left member, opposite to the top-left member, and
   the top-right member being hingedly and adjacently connected to the bottom-right member, opposite to the bottom-left member.

3. The collapsible target for improving an athlete's throwing accuracy as claimed in claim 2 comprises:
   the plurality of collapsible frames further comprises a lowest frame and a subsequent frame;
   the frame adjustment mechanism comprises a first scissor-lift member and a second scissor-lift member;
   the first scissor-lift member being collinearly and adjacently connected to the bottom-right member of the lowest frame;
   the second scissor-lift member being collinearly and adjacently connected to the bottom-left member of the lowest frame;
   the bottom-right member of the subsequent frame being collinearly and adjacently connected to the top-left member of the lowest frame, and
   the bottom-left member of the subsequent frame being collinearly and adjacently connected to the top-right member of the lowest frame.

4. The collapsible target for improving an athlete's throwing accuracy as claimed in claim 2 comprises:
   the plurality of collapsible frames further comprises a highest frame and a preceding frame;
   the bottom-right member of the highest frame being collinearly and adjacently connected to the top-left member of the preceding frame, and
   the bottom-left member of the highest frame being collinearly and adjacently connected to the top-right member of the preceding frame.

5. The collapsible target for improving an athlete's throwing accuracy as claimed in claim 2 comprises:
   the plurality of collapsible frames further comprises an intermediary frame, a preceding frame, and a subsequent frame;
   the bottom-right member of the intermediary frame being collinearly and adjacently connected to the top-left member of the preceding frame;
   the bottom-left member of the intermediary frame being collinearly and adjacently connected to the top-right member of the preceding frame;
   the bottom-right member of the subsequent frame being collinearly and adjacently connected to the top-left member of the intermediary frame, and
   the bottom-left member of the subsequent frame being collinearly and adjacently connected to the top-right member of the intermediary frame.

6. The collapsible target for improving an athlete's throwing accuracy as claimed in claim 1 comprises:

the frame adjustment mechanism comprises a first scissor-lift member, a second scissor-lift member, a fixed frame mount, a slide bar, a recessed track, a bar brace, and a locking mechanism;
the recessed track traversing into the base;
the fixed frame mount being adjacently connected to the base;
the fixed frame mount being positioned across the recessed track;
a distal end of the first scissor-lift member being pivotably connected to fixed frame mount;
the slide bar being slidably engaged along the recessed track;
a distal end of the second scissor-lift member being pivotably connected to the slide bar;
the distal end of the first scissor-lift member and the distal end of the second scissor-lift member being positioned offset from each other along the recessed track;
the bar brace being adjacently connected to the base in between the distal end of the first scissor-lift member and the distal end of the second scissor-lift member;
the bar brace being positioned across the recessed track, and
the locking mechanism being operatively integrated between the slide bar and the recessed track, wherein the locking mechanism is actuated to hold the slide bar in place along the recessed track.

7. The collapsible target for improving an athlete's throwing accuracy as claimed in claim 6 comprises:
the locking mechanism comprises a lock hole, an arm support, a rocker arm, a spring, and a lock pin;
the lock hole laterally traversing into the slide bar;
the rocker arm being pivotably mounted to the base by the arm support;
the spring being connected between a first end of the rocker arm and the base;
the lock pin being adjacently connected to a second end of the rocker arm, and
the lock hole being engaged by the lock pin.

8. The collapsible target for improving an athlete's throwing accuracy as claimed in claim 1 comprises:
each of the at least one ball-catching nets further comprises a target, and
the target being superimposed onto the pouch.

9. The collapsible target for improving an athlete's throwing accuracy as claimed in claim 1 comprises:
a plurality of stabilizing feet;
the plurality of stabilizing feet being distributed around the base, and
the plurality of stabilizing feet being peripherally connected around the base.

10. The collapsible target for improving an athlete's throwing accuracy as claimed in claim 1 comprises:
a handle;
the handle being adjacently connected to the base, and
the handle being offset from the frame adjustment mechanism along the base.

11. A collapsible target for improving an athlete's throwing accuracy comprises:
a plurality of collapsible frames;
a plurality of ball-catching nets;
a base;
a frame adjustment mechanism;
each of the plurality of collapsible frames comprises a top-left member, a top-right member, a bottom-left member, and a bottom-right member;

each of the at least one ball-catching nets comprises a pouch, a rigid frame, an elastic band, and a plurality of net fasteners;
the pouch comprises an opening rim;
the plurality of collapsible frames being serially connected to each other;
the plurality of collapsible frames being mounted onto the base by the frame adjustment mechanism;
each of the plurality of ball-catching nets being connected within a corresponding collapsible frame from the plurality of collapsible frames;
the top-left member being hingedly and adjacently connected to the top-right member;
the bottom-left member being hingedly and adjacently connected to the top-left member, opposite to the top-right member;
the bottom-right member being hingedly and adjacently connected to the bottom-left member, opposite to the top-left member;
the top-right member being hingedly and adjacently connected to the bottom-right member, opposite to the bottom-left member;
the rigid frame being integrated around the opening rim;
the elastic band being integrated around the opening rim;
the plurality of net fasteners being fixed around the corresponding collapsible frame, and
the elastic band being detachably attached to the plurality of net fasteners.

12. The collapsible target for improving an athlete's throwing accuracy as claimed in claim 11 comprises:
the plurality of collapsible frames further comprises a lowest frame and a subsequent frame;
the frame adjustment mechanism comprises a first scissor-lift member and a second scissor-lift member;
the first scissor-lift member being collinearly and adjacently connected to the bottom-right member of the lowest frame;
the second scissor-lift member being collinearly and adjacently connected to the bottom-left member of the lowest frame;
the bottom-right member of the subsequent frame being collinearly and adjacently connected to the top-left member of the lowest frame, and
the bottom-left member of the subsequent frame being collinearly and adjacently connected to the top-right member of the lowest frame.

13. The collapsible target for improving an athlete's throwing accuracy as claimed in claim 11 comprises:
the plurality of collapsible frames further comprises a highest frame and a preceding frame;
the bottom-right member of the highest frame being collinearly and adjacently connected to the top-left member of the preceding frame, and
the bottom-left member of the highest frame being collinearly and adjacently connected to the top-right member of the preceding frame.

14. The collapsible target for improving an athlete's throwing accuracy as claimed in claim 11 comprises:
the plurality of collapsible frames further comprises an intermediary frame, a preceding frame, and a subsequent frame;
the bottom-right member of the intermediary frame being collinearly and adjacently connected to the top-left member of the preceding frame;
the bottom-left member of the intermediary frame being collinearly and adjacently connected to the top-right member of the preceding frame;

the bottom-right member of the subsequent frame being collinearly and adjacently connected to the top-left member of the intermediary frame, and the bottom-left member of the subsequent frame being collinearly and adjacently connected to the top-right member of the intermediary frame.

15. The collapsible target for improving an athlete's throwing accuracy as claimed in claim 11 comprises:

the frame adjustment mechanism comprises a first scissor-lift member, a second scissor-lift member, a fixed frame mount, a slide bar, a recessed track, a bar brace, and a locking mechanism;

the recessed track traversing into the base;

the fixed frame mount being adjacently connected to the base;

the fixed frame mount being positioned across the recessed track;

a distal end of the first scissor-lift member being pivotably connected to fixed frame mount;

the slide bar being slidably engaged along the recessed track;

a distal end of the second scissor-lift member being pivotably connected to the slide bar;

the distal end of the first scissor-lift member and the distal end of the second scissor-lift member being positioned offset from each other along the recessed track;

the bar brace being adjacently connected to the base in between the distal end of the first scissor-lift member and the distal end of the second scissor-lift member;

the bar brace being positioned across the recessed track, and the locking mechanism being operatively integrated between the slide bar and the recessed track, wherein the locking mechanism is actuated to hold the slide bar in place along the recessed track.

16. The collapsible target for improving an athlete's throwing accuracy as claimed in claim 15 comprises:

the locking mechanism comprises a lock hole, an arm support, a rocker arm, a spring, and a lock pin;

the lock hole laterally traversing into the slide bar;

the rocker arm being pivotably mounted to the base by the arm support;

the spring being connected between a first end of the rocker arm and the base;

the lock pin being adjacently connected to a second end of the rocker arm;

the lock hole being engaged by the lock pin, and the elastic band being detachably attached to the plurality of net fasteners.

17. The collapsible target for improving an athlete's throwing accuracy as claimed in claim 11 comprises:

each of the at least one ball-catching nets further comprises a target, and the target being superimposed onto the pouch.

18. The collapsible target for improving an athlete's throwing accuracy as claimed in claim 11 comprises:

a plurality of stabilizing feet;

the plurality of stabilizing feet being distributed around the base, and the plurality of stabilizing feet being peripherally connected around the base.

19. The collapsible target for improving an athlete's throwing accuracy as claimed in claim 11 comprises:

a handle;

the handle being adjacently connected to the base, and the handle being offset from the frame adjustment mechanism along the base.

* * * * *